March 11, 1924.  1,486,755
F. INGERSOLL
WEEDING TOOL
Filed Sept. 19, 1922
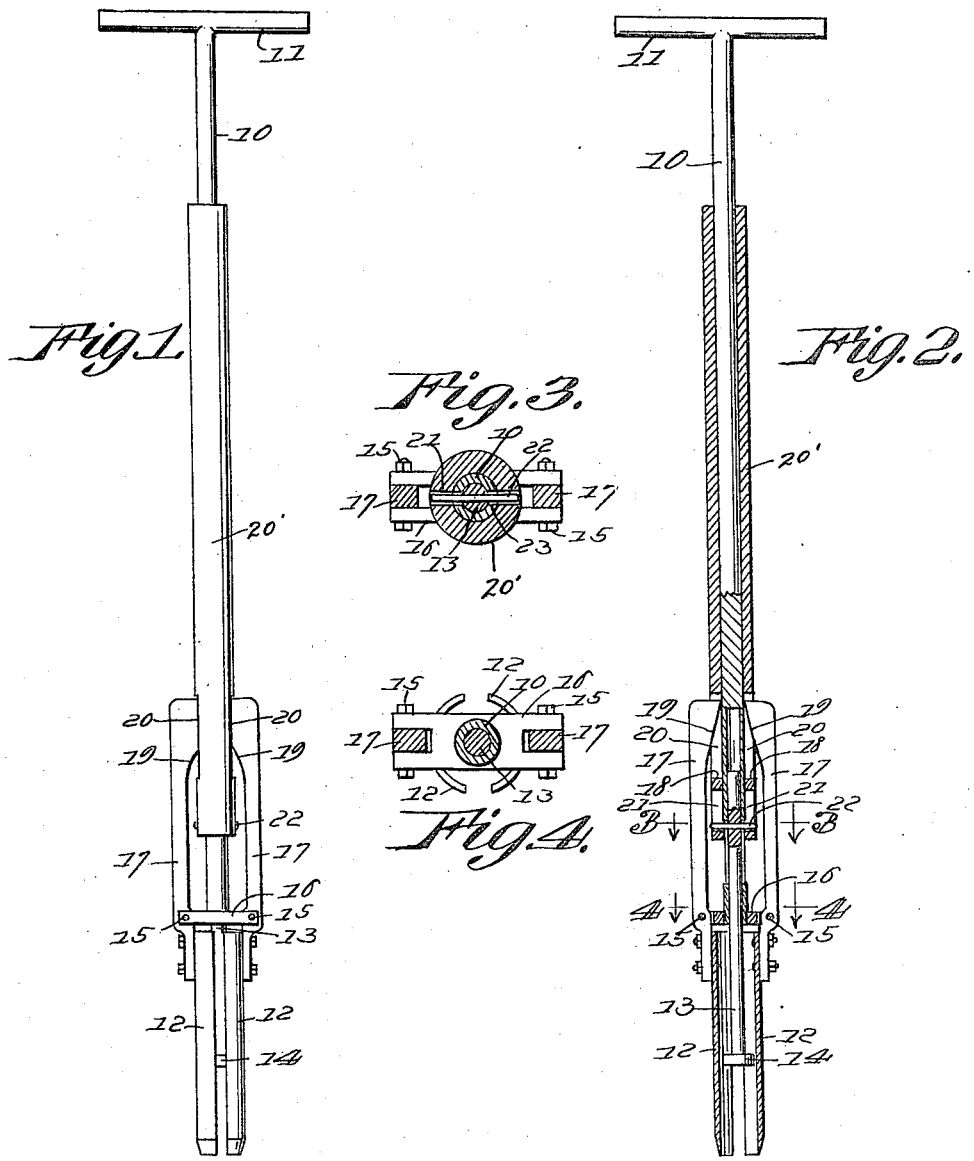
Inventor
Frank Ingersoll, Patented Mar. 11, 1924.

1,486,755

UNITED STATES PATENT OFFICE.

FRANK INGERSOLL, OF HANNIBAL, MISSOURI.

WEEDING TOOL.

Application filed September 19, 1922. Serial No. 589,226.

*To all whom it may concern:*

Be it known that FRANK INGERSOLL, a citizen of the United States of America, residing at Hannibal, in the county of Marion and State of Missouri, has invented new and useful Improvements in Weeding Tools, of which the following is a specification.

The object of the invention is to provide a simple and efficient device for the individual removal of weeds or objectionable plants such as dandelions, plantain and the like from lawns, gardens, etc., without disturbing adjacent growths of plants such as grass or the soil in proximity thereto; and with this object in view the invention consists in a construction and combination of parts of which a preferred embodiment is shown in the accompanying drawings, wherein:—

Figure 1 is a side view, and

Figure 2 is a sectional view of a tool embodying the invention.

Figures 3 and 4 are transverse sectional views respectively on the planes indicated by the lines 3—3 and 4—4 of Figure 2.

The tool consists of a shank or stem 10 provided at its upper end with a suitable cross head or handle 11, to which are pivotally connected the cross sectionally semi-cylindrical jaws 12 reduced to edges at their lower ends and adapted to penetrate the soil in surrounding relation with a weed for the purpose of removing the roots thereof. The shank or stem is preferably tubular and slidingly fitted therein at its lower end is a plunger 13 having a head 14 operating in the space between the jaws and adapted for movement toward the extremities of the jaws to expel a plant root and the soil associated therewith after the removal of the same from the ground.

The pivotal points of the jaws are indicated at 15 on a bracket 16 carried by the end of the stem or shank and connected with the jaws are arms 17 extended longitudinally of the shank or stem for actuation by a spreader movable longitudinally of the shank or stem between said arms,—the latter being provided with cam faces 19 for engagement by the spreader. In the construction illustrated the spreader consists of webs 18 defining one end of slots 20 carried by a sleeve 20' slidingly mounted on the shank or stem and adapted for terminal contact with the bracket 16 for driving the jaws into the soil if pressure applied to the grip or handle at the upper end of the shank be found insufficient. This sleeve is provided with slots 21 for engagement with a cross pin 22 carried by the plunger, so that an upward sliding movement of the sleeve serves to retract the plunger to expose the lower ends of the jaws while an opposite movement of the sleeve causes an extension of the plunger to expel any earth and plant root which may have been engaged and extracted from the ground by the jaws. There is sufficient lost motion between the sleeve and the plunger to permit of the use of the former as a means of driving the jaws into the soil as above indicated and an upward movement of the sleeve brings the spreader into contact with the cam faces of the operating arms and serves to close the jaws or move them toward each other to grip or clamp an interposed core of soil.

In operation the jaws may be forced into the ground after centering the tool over the plant to be extracted and advanced by pressure on the cross head or handle, the plunger being retracted by movement of the sleeve or being repressed by the soil as it enters the space between the jaws, and after the desired penetration of the jaws has been secured the sleeve may be drawn upward to cause the closing of the jaws or the pressure of the soil against the plunger may be relied upon to force the sleeve and therefore the spreader upward to cause such closing movement. Upon the withdrawal of the tool from the ground, carrying between the jaws thereof a core of earth with the roots of the plant to be extracted, the said core of earth may be expelled by the downward movement of the sleeve to advance the plunger toward the ends of the jaws.

The tool is adapted for removing single weeds or plants from a lawn without material or objectionable disturbance of the surrounding soil on the grass roots and therefore without disfiguring the lawn as by the use of a hoe, pick, trowel or like implement, and moreover the operation of removing the weeds may be accomplished quickly and without special effort on the part of the operator.

Having described the invention, what is claimed as new and useful is:—

1. A weeding tool having a stem, pivotally mounted cooperating jaws carried by the stem and provided with terminal soil penetrating edges, a sleeve slidingly mounted on the stem, and means actuable by said sleeve for closing the jaws and consisting of arms carried by the jaws and extended longitudinally of the stem and a spreader carried by the sleeve for engagement with said arms.

2. A weeding tool having a stem, pivotally mounted cooperating jaws carried by the stem and provided with terminal soil penetrating edges, a sleeve slidingly mounted on the stem, and means actuable by said sleeve for closing the jaws and consisting of operating arms carried by the jaws and provided with cam faces, and a spreader carried by the sleeve for engagement with the cam faces of said arms.

3. A weeding tool having a tubular stem, cooperating earth penetrating jaws carried by and pivotally mounted upon said stem and provided with cam faced operating arms, a plunger slidingly mounted in the stem and terminally disposed between said jaws, and a sleeve slidingly mounted upon the stem, having a spreader for cooperation with the cam faced jaw operating arms and having a pin and slot connection with said plunger.

In testimony whereof he affixes his signature.

FRANK INGERSOLL.